(12) United States Patent
Baker

(10) Patent No.: US 11,359,875 B1
(45) Date of Patent: Jun. 14, 2022

(54) RADIANT HEAT PUMP

(71) Applicant: David M. Baker, Mosinee, WI (US)

(72) Inventor: David M. Baker, Mosinee, WI (US)

( * ) Notice: Subject to any disclaimer, the term of this patent is extended or adjusted under 35 U.S.C. 154(b) by 0 days.

(21) Appl. No.: 15/675,552

(22) Filed: Aug. 11, 2017

Related U.S. Application Data

(60) Provisional application No. 62/373,488, filed on Aug. 11, 2016, provisional application No. 62/376,526, filed on Aug. 18, 2016, provisional application No. 62/379,124, filed on Aug. 24, 2016.

(51) Int. Cl.
*F28F 23/00* (2006.01)

(52) U.S. Cl.
CPC .................. *F28F 23/00* (2013.01)

(58) Field of Classification Search
CPC ....... F28D 15/00; F16L 59/065; H01M 10/44; H01M 10/46; H01M 10/60; F28F 23/00; H02S 10/30
See application file for complete search history.

(56) References Cited

U.S. PATENT DOCUMENTS

| | | | |
|---|---|---|---|
| 3,745,482 A | 7/1973 | Patel | |
| 3,887,882 A * | 6/1975 | Smith | ..................... H01S 3/094 359/345 |
| 5,447,032 A | 9/1995 | Epstein et al. | |
| 5,615,558 A | 4/1997 | Cornell | |
| 6,041,610 A | 3/2000 | Edwards et al. | |
| 6,132,823 A * | 10/2000 | Qu | ........................... C09K 5/00 428/34.6 |
| 6,684,645 B2 | 2/2004 | Chu et al. | |
| 8,227,962 B1 * | 7/2012 | Su | ........................... F21K 9/232 313/46 |
| 8,261,557 B2 | 9/2012 | Barker et al. | |
| 2003/0136131 A1 | 7/2003 | Chu et al. | |
| 2005/0057831 A1 | 3/2005 | Marshall | |
| 2008/0130700 A1 * | 6/2008 | Linder | ..................... H01S 3/03 372/55 |
| 2011/0107770 A1 | 5/2011 | Oksanen et al. | |
| 2012/0141851 A1 * | 6/2012 | Hou | .................... H01M 2/1088 429/96 |

(Continued)

OTHER PUBLICATIONS

Einstein, Albert, Emission and Absorption of Radiation in Quantum Theory, Verhandlungen der Deutschen Physikalischen Gesellschaft, 18, pp. 318-323, 1916. (English translation provided.).

(Continued)

*Primary Examiner* — Tho V Duong
(74) *Attorney, Agent, or Firm* — Underwood & Associates, LLC

(57) ABSTRACT

A method for transferring heat from a lower temperature heat source to a higher temperature heat sink using only the energy in the heat source and heat sink. The method uses a converting material which is adapted to receive external radiation from the lower temperature heat source, absorb the external radiation exciting an element of the converting material, non-radiatively transfer heat within the converting material by relaxing an element of the converting material, and conductively transferring heat from the converting material to the exterior of the converting material, where the heat can be used for an external process or application.

6 Claims, 4 Drawing Sheets

(56) References Cited

U.S. PATENT DOCUMENTS

| | | |
|---|---|---|
| 2013/0118542 A1 | 5/2013 | Levy |
| 2014/0042336 A1* | 2/2014 | Bezel ............... H01J 61/02 |
| | | 250/424 |
| 2014/0102678 A1* | 4/2014 | Zou ............... H05K 5/0213 |
| | | 165/135 |
| 2014/0102686 A1 | 4/2014 | Yu et al. |
| 2015/0075181 A1 | 3/2015 | Epstein et al. |
| 2015/0171251 A1 | 6/2015 | Rotschild et al. |

OTHER PUBLICATIONS

Werbe-Fuentes, Jordan et al., Carbon Dioxide Absorption in the Near Infrared, online at https://jvarekamp.web.wesleyan.edu/CO2/FP-1.pdf, May 14, 2008 (according to document metadata). No other publication information is available.

* cited by examiner

RADIANT HEAT PUMP

RELATED APPLICATIONS

This application is a non-provisional application claiming priority from U.S. Provisional Application Ser. No. 62/373,488 titled "Heat Pump" filed Aug. 11, 2016, which application is incorporated herein by reference in its entirety.

This application is a non-provisional application claiming priority from U.S. Provisional Application Ser. No. 62/376,526 titled "Heat Pump" filed Aug. 18, 2016, which application is incorporated herein by reference in its entirety.

This application is a non-provisional application claiming priority from U.S. Provisional Application Ser. No. 62/379,124 titled "Heat Pump" filed Aug. 24, 2016, which application is incorporated herein by reference in its entirety.

TECHNICAL FIELD

The disclosed embodiments relate generally to heat transfer, and more particularly, to heat pumps using a selective radiation effect.

BACKGROUND

The 2nd Law of Thermodynamics, hereafter referred to simply as the 2nd Law, has been one of the bedrocks for our understanding of thermodynamics since its development in the 1800s by luminaries including Nicolas Leonard Sadi Carnot, Rudolf Clausius, and William Thompson, who is also known as Lord Kelvin. The 2nd Law governs many aspects of thermodynamics. These include maximum possible efficiencies and possible and impossible thermodynamic configurations, including the prohibition of heat engines which operate from a single heat reservoir. The 2nd Law has been and, up to the date of this disclosure, continues to be accepted so completely that any invention disclosure that claims to violate the 2nd Law is almost automatically rejected due to lack of operability. Conversely, any invention disclosure that successfully teaches an invention that supersedes our current understanding of the 2nd Law would almost automatically meet the patentability tests for novelty and unobviousness.

The First Law of Thermodynamics, hereafter referred to simply as the First Law, was developed by adapting the principles of the conversation of energy for use in thermodynamics by luminaries including Rudolf Clausius and William Rankine in the same time period as the development of the 2nd Law.

It is useful to note that the First and 2nd Laws were based on observations of the physical world around us and, as mentioned, were developed in the mid-1800s, prior to the understanding, development, and acceptance of the quantum nature of physics. The quantum nature of physics was developed in the late 1800s and early 1900s most notably by Albert Einstein with valuable contributions by Max Plank, Ludwig Boltzmann, Werner Heisenberg, and many others. Einstein's "The Quantum Theory of Radiation" from 1917 is of particular relevance to the field of the inventions disclosed herein.

Einstein's work led to the realization that the First Law developed from classical systems did not entirely apply to systems that operate on the quantum level. This work led to the extension of the principle of conversation of energy through the development of the mass-energy equivalence as expressed by the famous equation $E=mc^2$.

Other inventors have used the quantum physical properties of materials and the properties of the interaction between materials and radiation to provide for the transfer of heat for heating or cooling purposes, perhaps most notably in the field of optical or laser molecular cooling. Several patents serve to illustrate and teach the use of quantum interaction between material and radiation for optical or laser molecular cooling.

"COOLING BY RESONATOR-INDUCED COHERENT SCATTERING OF RADIATION"; U.S. Pat. No. 6,684,645; Feb. 3, 2004; Chu et al.

"FLUORESCENT REFRIGERATION"; U.S. Pat. No. 5,447,032; Sep. 5, 1995; Epstein et al.

"OPTICAL COOLING OF SOLIDS"; U.S. Pat. No. 5,615,558; Apr. 1, 1997; Cornell et al.

"OPTICAL REFRIGERATOR USING REFLECTIVITY TUNED DIELECTRIC MIRRORS"; U.S. Pat. No. 6,041,610; Mar. 28, 2000; Edwards. et al.

These disclosures have not described inventions that justify or require that the 2nd Law be superseded or extended.

SUMMARY

In some embodiments, a method of transferring heat includes: receiving external radiation from an external source of radiation, absorbing a plurality of photons of the external radiation using a converting material, one or more of the photons exciting or causing an increase in energy level of the converting material to a higher quantum level, non-radiatively transferring heat within the converting material, the transfer causing a non-radiative relaxation or decrease in energy of the converting material to a lower quantum level, and conductively transferring heat from the converting material to the exterior of the converting material, where the heat can be used for an external process or application. The method operates with the converting material at a higher temperature than the temperature of the external source of radiation, enabling the flow of heat from the lower temperature external radiation source through the higher temperature converting material and ultimately to the external process or application.

The aforementioned method may be performed by a heat pump, which has a converting material adapted to receiving external radiation from an external source of radiation, absorbing a plurality of photons of the external radiation, increasing in internal energy by one or more quantum levels as a result of the absorption, non-radiatively transferring heat within the converting material, decreasing in internal energy by one or more quantum levels as a result of the non-radiative transfer, and conductively transferring heat from the converting material to the exterior of the converting material. The heat pump operates with the converting material at a higher temperature than the temperature of the external source of radiation, enabling the flow of heat from the lower temperature external radiation source through the higher temperature converting material and ultimately to the external process or application.

In some embodiments of the invention, the converting material may include a gas mixture and a solid enclosure to contain the gas mixture.

In some embodiments of the invention, the gas mixture may include carbon dioxide and helium.

In some embodiments, the solid enclosure may be constructed from materials that include a material that has a high transmittance and a low emissivity.

In some embodiments, the solid enclosure may be made from materials that include potassium bromide.

In some embodiments, the converting material may be constructed from a solid state material or materials adapted to perform the aforementioned method.

In some embodiments, the solid enclosure may be substantially surrounded by an evacuated space to minimize conductive and convective losses.

In some embodiments, the solid enclosure may be partially constructed from a low emissivity material to minimize thermal radiation losses.

The embodiments of the disclosed inventions, in their various forms will enable many different applications and uses, including, but not limited to: heating, cooling, air conditioning, heat engines, and refrigeration.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, and components have not been described in detail so as not to unnecessarily obscure aspects of the embodiments.

U.S. Provisional Application Ser. No. 62/379,124, which is incorporated herein by reference in its entirety, provides a complete and full description of the methods and operation of some embodiments of the invention. It would generally be useful to review and understand the teachings disclosed in 62/379,124.

Figure 1:
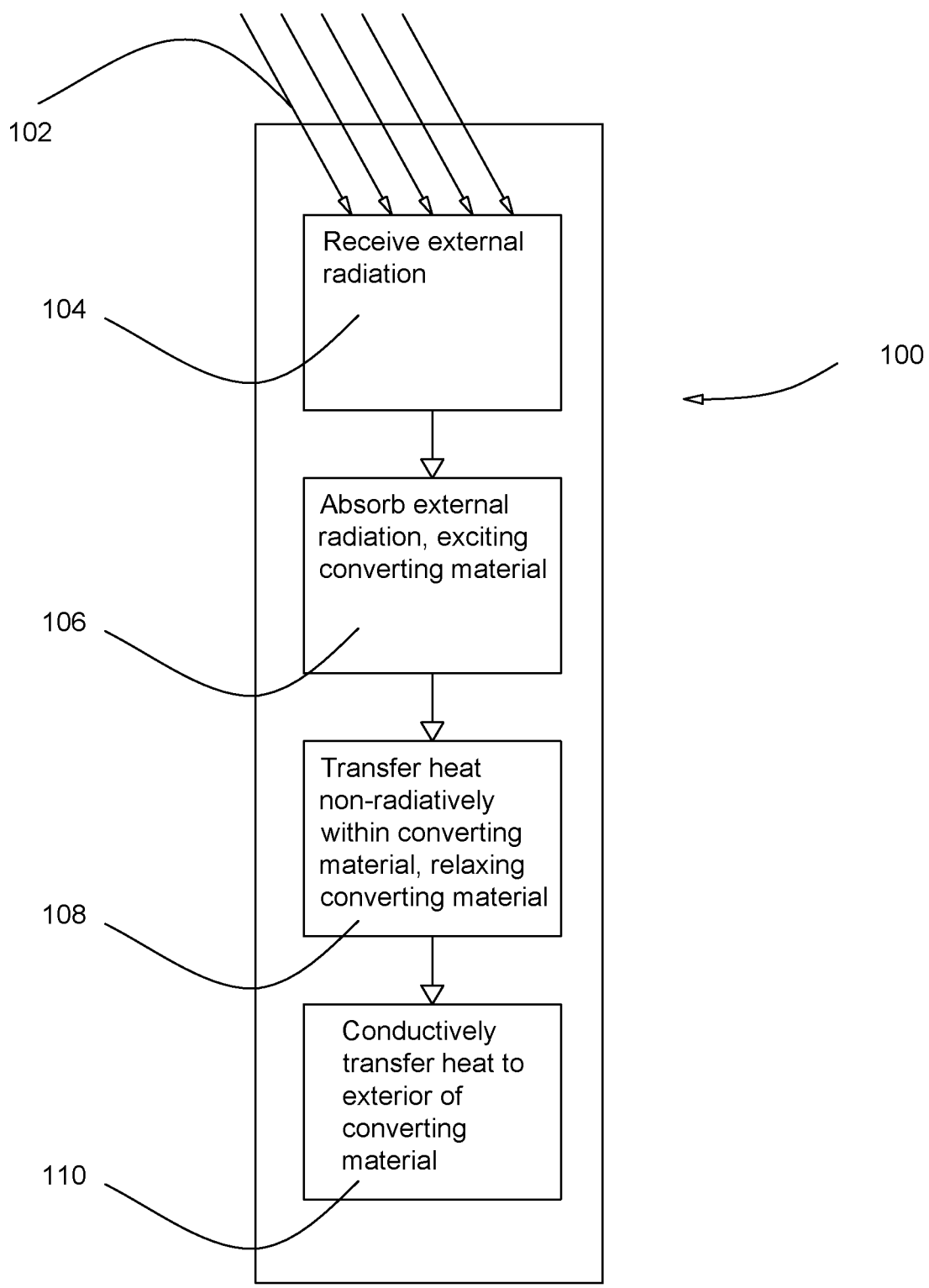
FIG. 1 is a flow diagram illustrating a process for transferring heat, according to some embodiments of the invention.
Figure 2:
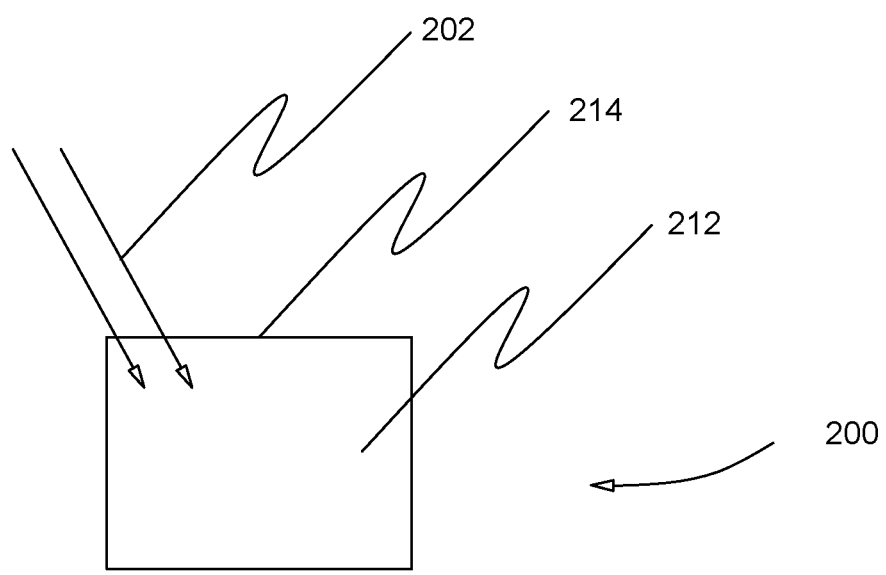
FIG. 2 illustrates a heat pump showing a top view and a front view, according to some embodiments of the invention.

FIG. 1 is a flow diagram illustrating a process 100 for transferring heat from a lower temperature heat source to a higher temperature heat sink using a converting material which is adapted to receive external radiation 102 per process 100. FIG. 2 shows an embodiment of a heat pump 200 which uses a converting material 212 adapted to process 100 to receive external radiation 202. The term converting material 212 is defined to include one or more substances in any state, including but not limited to solid, liquid, gas or plasma, or any combination thereof. The converting material 212 can be comprised of one or more elements in various combinations for different embodiments of the invention, where the term element can include, but is not limited to, one or more types of molecules, atoms, ions, sub-atomic particles (electrons, neutrons, protons, etc.) or combinations thereof. In some embodiments, the converting material 212 can consist of a molecular gas mixture 324 enclosed by a solid enclosure 316. In other embodiments, the converting material 212 can consist of elements in the solid state, including but not limited to the types of materials disclosed in the optical and laser molecular cooling patents listed in the background section of this specification.

In general, heat transfer can occur in one of several modes including, but not limited to conduction, convection, and radiation, where the listed three modes have the standard meaning. In general, heat transfer in conduction and convection flows from a higher temperature region to a lower temperature region. For the purposes of this specification, the terms conductively transfer, conductive transfer, and conductively transferring are defined to include the non-radiative modes of heat transfer including, but not limited to, conduction and convection. A body is used to represent a discrete collection of elements, separated from other bodies by an unlike substance including air, vacuum, liquid or solid. A region can represent a volume within a body, an entire body, or a collection of multiple bodies of one or more type.

Radiation heat transfer occurs simultaneously in both directions, from a higher temperature region or body to a lower temperature region or body and concurrently from the lower temperature body to the higher temperature body. It is commonly understood by persons skilled in the art that the absorption and emissivity constants for a specific material or body for a given radiation wavelength are equal, causing the net radiative heat flow to occur from the higher temperature body to the lower temperature body.

The absorption and emissivity constants are based on physical quantum properties of the elements and can depend upon many factors including the type of absorption/emission such as molecular vibration, electron excitation, etc.; material type; material structure; and material state. From the earliest work on quantum physics, it has been believed and understood that the physical quantum structure was such that the probability of emission and absorption were related in a manner that ensured that the net radiative heat flow was always from the higher temperature body to the lower temperature body.

A key inventive step of the current and related disclosures is the recognition of the importance of the fact that an element that has been excited by absorbing a photon of electromagnetic radiation of the appropriate wavelength can relax in a number of ways including, but not limited to, radiation, re-radiation, stimulated radiation, scattering, and non-radiative relaxation including, but not limited to, molecular collision. Of particular importance are those cases or materials in which the non-radiative relaxation occurs with a much shorter time constant than radiation or re-radiation.

The converting material 212 can receive external radiation 202 from an external source of radiation, which may be at a lower temperature than the temperature of the converting material. The external source of radiation may be comprised of one or more sources of radiation, including but not limited to materials in the solid, liquid, gas or plasma states or combinations thereof. The term radiation includes the full spectrum of electromagnetic radiation including but not limited to radio waves, microwaves, infrared, visible, and ultra-violet.

After the converting material 212 receives the external radiation 104, an element of converting material 212 absorbs a photon of the external radiation, which causes the element of converting material to excite to a higher quantum level with a resulting increase of energy of the element 106. The converting material 212 is adapted to process 100 in part by a configuration which provides for a shorter time constant for non-radiative relaxation than for re-radiation.

The element of converting material 212 then transfer heats energy non-radiatively to another element of the converting material reducing the energy of the first previously excited element 108. The process of losing energy and dropping to a lower quantum energy state is often referred to as relaxing to a lower energy state.

This non-radiative transfer of heat 108 raises the average energy level and temperature of the converting material 212. It will be obvious to one skilled in the art that not all absorbed radiation energy will be subsequently transferred non-radiatively. Some percentage of the elements that absorb energy will subsequently re-radiate that energy or a portion of that energy. This does not stop the process, but does impact the process efficiency.

The converting material's ability to gain enough energy to gain and maintain a useful positive temperature differential relative to the external radiation source is dependent upon several factors, including but not limited to the percentage of absorbed radiation which is re-radiated versus the percentage that is transferred non-radiatively as well as convection and conduction losses from the exterior 214 of the converting material. As the average temperature of the converting material begins to rise in the region of absorption and non-radiative heat transfer, a temperature differential will develop between this region and the exterior 214 of the converting material. This temperature differential will cause a conductive heat transfer 110 from the absorption/non-radiative heat transfer region to the exterior of the converting material. As the temperature of one or more regions at the exterior of the converting material rises above the external temperature, the heat from process 100 can be used in the desired external process.

The size and configuration of the heat transfer region at the exterior 214 of the converting material 212 will vary depending upon the characteristics of the converting material and the requirements of the external application.

Figure 3:
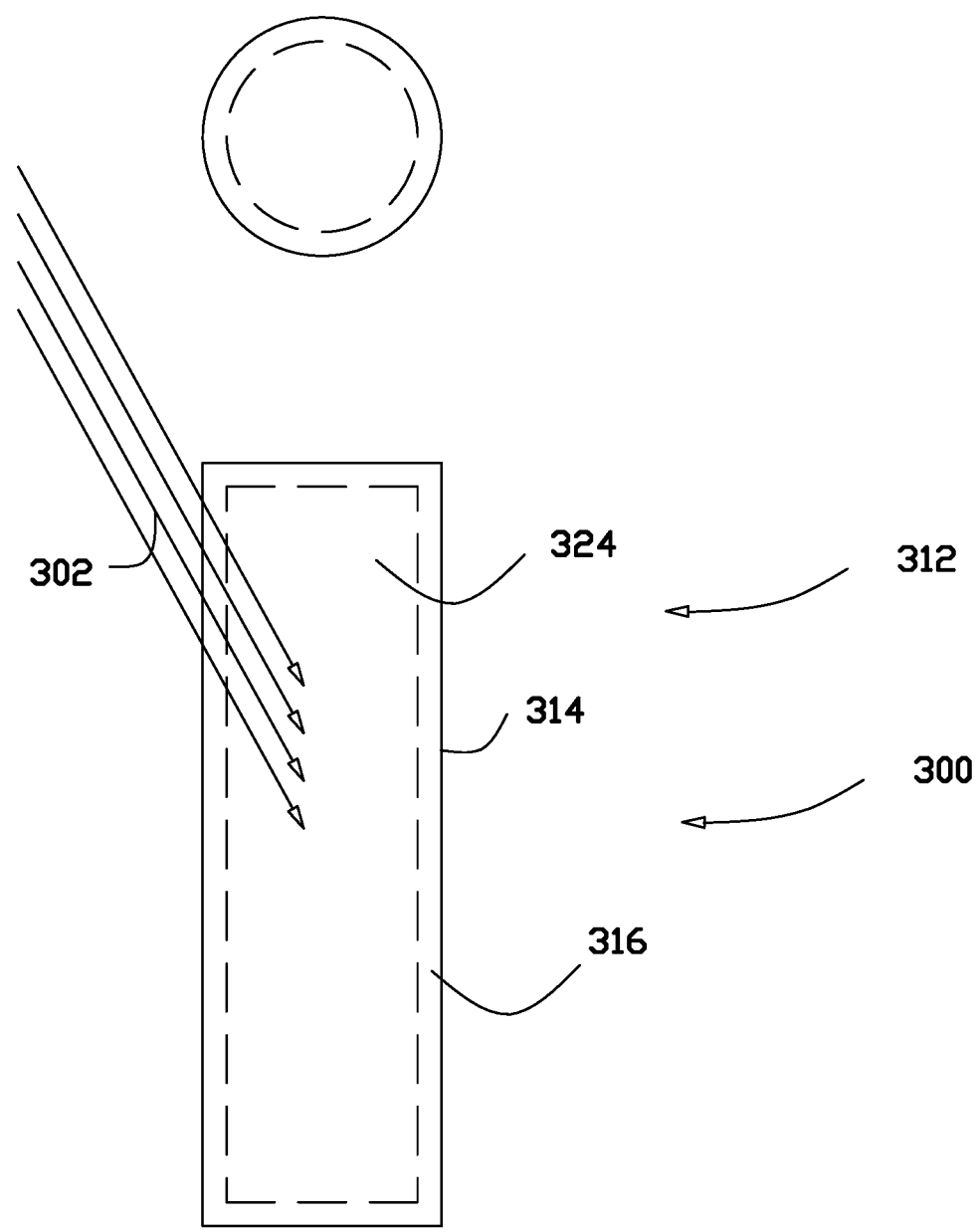
FIG. 3 illustrates a heat pump showing a top view and a front view, according to some embodiments of the invention.

FIG. 3 shows a heat pump 300 used with some embodiments. The heat pump 300 is adapted to receive external radiation 302 using a converting material 312 which in some embodiments includes a gas mixture 324 enclosed in a solid enclosure 316. In some embodiments, the gas mixture 324 includes carbon dioxide and helium. In some embodiments the solid enclosure 316 includes potassium bromide, which has high transmittance and low emissivity to maximize the radiative heat gained and minimize radiation losses. The exterior of the solid enclosure 314 is used to transfer heat from the heat pump to an external application.

Figure 4:
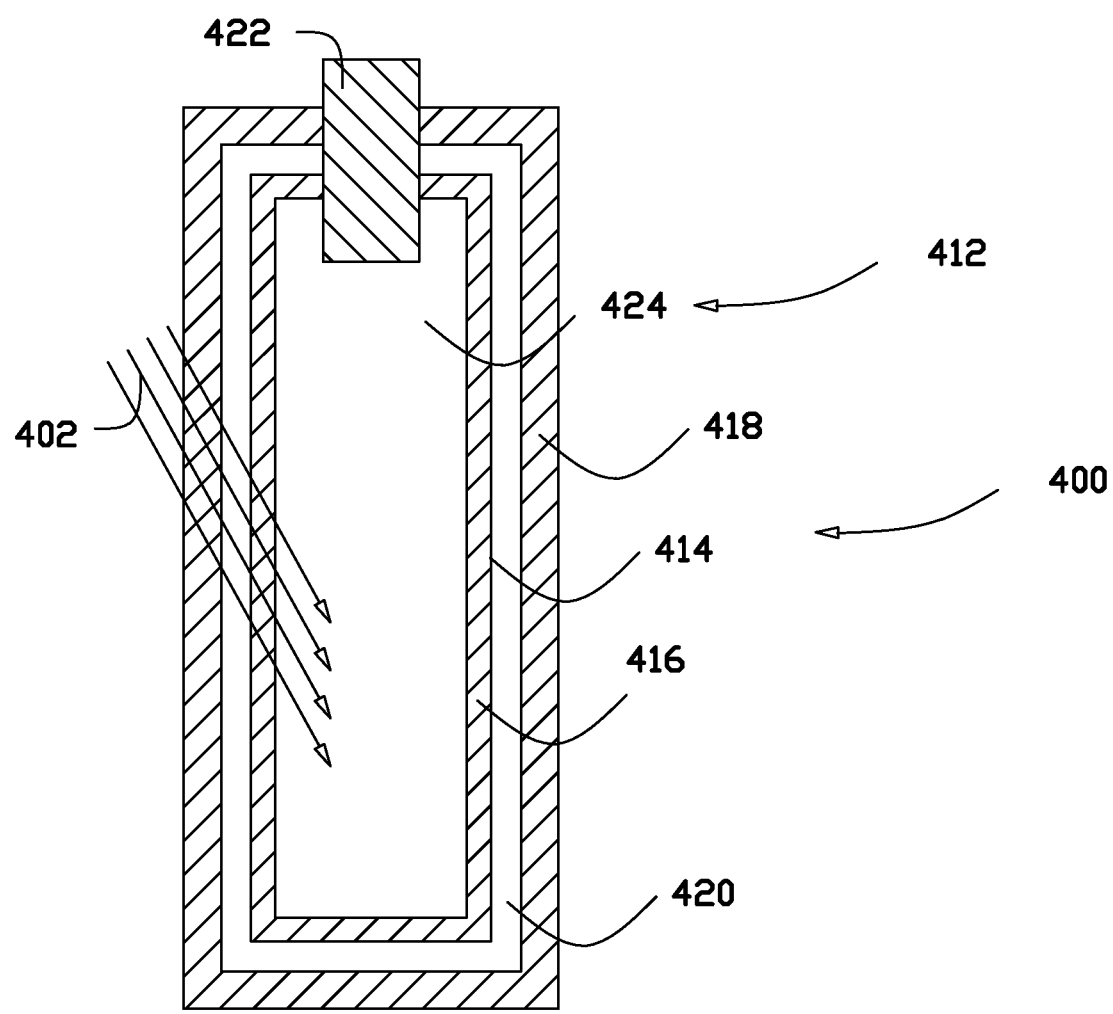
FIG. 4 illustrates a heat pump showing a top view and a front section view, according to some embodiments of the invention.

FIG. 4 shows a heat pump 400 used with some embodiments. The heat pump 400 is adapted to receive external radiation 402 using a converting material 412 which in some embodiments includes a gas mixture 424 enclosed in a solid enclosure 416. An outer enclosure 418 substantially surrounds the solid enclosure 416. The space 420 between the outer enclosure 418 and the solid enclosure 416 is evacuated to minimize conduction and convection losses. A conducting member 422 is provided to conductively transfer heat from the gas mixture 424 region of the converting medium 412 to the external environment so that the heat can be used in an external application. In this embodiment, the exterior of the solid enclosure 414 is not used to transfer the heat to an external application.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A heat pump, comprising:
a converting assembly, wherein said converting assembly comprises a converting material configured to:
receive radiation from an external source of radiation;
absorb a plurality of photons of said radiation, said converting material increasing in internal energy by one or more quantum levels as a result of the absorption;
non-radiatively transfer heat within said converting material;
decrease in internal energy by one or more quantum levels as a result of the non-radiative transfer; and
conductively transfer heat from said converting material to the exterior of said converting material;
wherein said converting material operates at a higher temperature than said external source of radiation;
wherein said converting assembly comprises a gas mixture and a solid enclosure, said solid enclosure substantially surrounding and containing said gas mixture;
wherein said solid enclosure comprises a material with high transmittance and low emissivity; and
wherein said solid enclosure material comprises potassium bromide.

2. The heat pump of claim 1, wherein said gas mixture comprises carbon dioxide and helium.

3. A method for transferring heat, the method comprising:
receiving external radiation from an external source of radiation;
absorbing a plurality of photons of said radiation using a converting material, one or more of said photons causing an increase in energy level of said converting material by one or more quantum levels;
non-radiatively transferring heat within said converting material, the transfer causing a decrease in energy of said converting material by one or more quantum levels; and
conductively transferring heat from said converting material to the exterior of said converting material;
wherein said converting material operates at a higher temperature than said external source of radiation;
wherein said converting material comprises a gas mixture and a solid enclosure, said solid enclosure substantially surrounding and containing said gas mixture;
wherein said solid enclosure comprises a material with high transmittance and low emissivity; and
wherein the enclosure material comprises potassium bromide.

4. A heat pump, comprising:
a converting material configured to:
receive radiation from an external source of radiation;
absorb a plurality of photons of said radiation, said converting material increasing in internal energy by one or more quantum levels as a result of the absorption;
non-radiatively transfer heat within said converting material;

decrease in internal energy by one or more quantum levels as a result of the non-radiative transfer; and conductively transfer heat from said converting material to the exterior of said converting material;

wherein said converting material operates at a higher temperature than said external source of radiation;

wherein said converting material comprises a gas mixture and a solid enclosure, said solid enclosure substantially surrounding and containing said gas mixture;

wherein said solid enclosure comprises a material with high transmittance and low emissivity; and wherein said solid enclosure material comprises potassium bromide.

5. A heat pump, comprising:

a converting material;

an outer enclosure, substantially surrounding a solid enclosure;

an evacuated space, situated between said outer enclosure and said solid enclosure; and a conducting member, extending through said solid enclosure and said outer enclosure, in conductive contact with said gas mixture;

wherein said converting material operates at a higher temperature than said external source of radiation;

wherein said converting material comprises a gas mixture and a solid enclosure, said solid enclosure substantially surrounding and containing said gas mixture; and wherein said converting material is configured to:
  receive radiation from an external source of radiation;
  absorb a plurality of photons of said radiation, said converting material increasing in internal energy by one or more quantum levels as a result of the absorption;
  non-radiatively transfer heat within said converting material;
  decrease in internal energy by one or more quantum levels as a result of the non-radiative transfer; and
  conductively transfer heat from said converting material to the exterior of said converting material.

6. A heat pump, comprising:

a converting assembly, wherein said converting assembly comprises a converting material configured to:

receive radiation from an external source of radiation;

absorb a plurality of photons of said radiation, said converting material increasing in internal energy by one or more quantum levels as a result of the absorption;

non-radiatively transfer heat within said converting material;

decrease in internal energy by one or more quantum levels as a result of the non-radiative transfer; and conductively transfer heat from said converting material to the exterior of said converting material;

wherein said converting material operates at a higher temperature than said external source of radiation;

wherein said converting assembly comprises a gas mixture and a solid enclosure, said solid enclosure substantially surrounding and containing said gas mixture;

an outer enclosure substantially encasing said converting assembly;

an evacuated space, situated between said outer enclosure and said converting assembly; and a conducting member, extending through said converting assembly and said outer enclosure, in conductive contact with said gas mixture.

* * * * *